(12) United States Patent
Laskar et al.

(10) Patent No.: US 12,242,356 B1
(45) Date of Patent: Mar. 4, 2025

(54) INTELLIGENT DATA SLICING

(71) Applicant: Own Data Company Ltd, Tel Aviv (IL)

(72) Inventors: Surya Kiran Laskar, Norwood, NJ (US); Shishir Sharad Kinkar, Englewood, NJ (US)

(73) Assignee: Own Data Company Ltd, Tel Aviv (IL)

( * ) Notice: Subject to any disclaimer, the term of this patent is extended or adjusted under 35 U.S.C. 154(b) by 0 days.

(21) Appl. No.: 18/421,342

(22) Filed: Jan. 24, 2024

(51) Int. Cl.
*G06F 11/14* (2006.01)
(52) U.S. Cl.
CPC ...... *G06F 11/1458* (2013.01); *G06F 2201/84* (2013.01)
(58) Field of Classification Search
CPC ............. G06F 2009/4557; G06F 3/065; G06F 11/1461; G06F 11/1458; G06F 11/1469; G06F 2201/84
USPC ........................................................ 707/654
See application file for complete search history.

(56) References Cited

U.S. PATENT DOCUMENTS

| | | | |
|---|---|---|---|
| 9,501,365 B2 | 11/2016 | Parab | |
| 9,633,051 B1 | 4/2017 | Maccanti et al. | |
| 10,983,873 B1 | 4/2021 | Blackard | |
| 11,663,086 B2 | 5/2023 | Brenner et al. | |
| 11,809,281 B2 | 11/2023 | Rakesh et al. | |
| 2017/0286234 A1 | 10/2017 | Shulga et al. | |
| 2020/0159625 A1* | 5/2020 | Hutcheson | ......... G06F 11/1461 |
| 2023/0112207 A1 | 4/2023 | Yadav et al. | |

FOREIGN PATENT DOCUMENTS

IN 311641 B 4/2019

* cited by examiner

*Primary Examiner* — Hung T Vy

(74) *Attorney, Agent, or Firm* — Fish & Richardson P.C.

(57) ABSTRACT

Methods, systems, and apparatus, including computer programs encoded on computer storage media, for backing up a data object in blocks. One of the methods includes determining, for a data object of a backup process, whether a size of the data object or an estimated backup time of the data object satisfies a criterion that, when satisfied, indicates that at least two blocks of the data object should be separately fetched from the source system by different workers; determining one or more markers for end points of the at least two blocks using data from a prior backup of the data object; and causing, at least partially concurrently for two or more blocks from the at least two blocks, a respective backup worker to fetch the respective block from a source system using at least one marker from the one or more markers that defines an end of the respective block.

20 Claims, 5 Drawing Sheets

| Id 402 | Name | Modified At |
|---|---|---|
| 051f12a387a5d9d07dcf84c7dabb351d | | |
| 0a3b5ee38765d9d07dcf84c7dabb3580 | | |
| 0f601e638761d9d07dcf84c7dabb3548 | | |
| 19999a6b8725d9d07dcf84c7dabb35c9 | | |
| 23cf0aef8721d9d07dcf84c7dabb3560 | | |
| 2e01a66b87a5d9d07dcf84c7dabb3568 | | |
| 33219a278761d9d07dcf84c7dabb3534 | | |
| 3d69962b8725d9d07dcf84c7dabb356e | | |
| 47b15aa78761d9d07dcf84c7dabb35fb | | |
| 51ef8eef8721d9d07dcf84c7dabb353b | | |
| 613f1aa387a5d9d07dcf84c7dabb3508 | | |
| 6b6f16e387a5d9d07dcf84c7dabb359d | | |
| 708a16238765d9d07dcf84c7dabb35e2 | | |
| 7ffdce2b8721d9d07dcf84c7dabb3574 | | |
| 8a3ad2af8725d9d07dcf84c7dabb3567 | | |
| 94785a638725d9d07dcf84c7dabb35b3 | | |
| a3ca16a38765d9d07dcf84c7dabb35b9 | | |
| adfc02678721d9d07dcf84c7dabb3557 | | |
| b31c92e78765d9d07dcf84c7dabb3501 | | |
| bd63da6f8761d9d07dcf84c7dabb3514 | | |
| c7aad6638765d9d07dcf84c7dabb3503 | | |
| cccc82278721d9d07dcf84c7dabb35b4 | | |
| d70a526f8725d9d07dcf84c7dabb356e | | |
| e141de278761d9d07dcf84c7dabb3565 | | |
| e659122b8725d9d076cf84c7dabb3551 | | |
| eb7012a38761d9d07dcf84c7dabb358c | | |
| f08c5a2b8765d9d07dcf84c7dabb3565 | | |
| f5afceaf8721d9d07dcf84c7dabb358a | | |
| fad99aeb8725d9d07dcf84c7dabb35ef | | |

400

Block 1 404a (rows 1–10)
Block 2 404b (rows 11–20)
Block 3 404c (rows 21–29)

FIG. 4

INTELLIGENT DATA SLICING

BACKGROUND

This specification relates to scheduling jobs to back up a large database, e.g., a large cloud-based data store.

Cloud-based applications generally use some kind of database in the cloud to store data. Typically, those data are stored in objects which correspond to different database tables, e.g., accounts, contacts, or opportunities, and vary in size, from megabytes to gigabytes to terabytes. The sizes of the objects are generally dynamic in nature and change all the time.

A data backup service for such cloud-based information systems will generally be responsible for a full extraction, i.e., backup, of the database on a regular basis, e.g., daily or weekly. Data backup services for cloud-based information systems extract data over the Internet.

The typical way of extracting data from cloud-based information systems is through application program interfaces ("APIs"), e.g., REST or SOAP interfaces over the Internet. An information system generally imposes many constraints that affect the performance of the APIs at the time of the extraction, e.g., their latency, which may be related to physical distance and network topology, and their throughput, which may be related to hardware performance, software throttling, or resource contention from other applications running at the same time. Information system constraints are dynamic in nature and can change from time to time.

One performance goal, and often the most important performance goal, for a backup service when extracting data from a cloud-based information system is to minimize the total elapsed time for the extraction. However, actual performance is highly dependent on the behavior of the APIs and the amount of data used by the service during the data extraction.

One common approach for backup services to speed up the extraction is to leverage multiple extraction streams to work in parallel, e.g., three different data extraction workers extracting data in parallel from different objects. One of the basic optimization approaches is to schedule longer jobs upfront to avoid idling workers.

SUMMARY

In general, one aspect of the subject matter described in this specification can be embodied in methods that include the actions of determining, for a data object of a backup process for a source system, whether a size of the data object or an estimated backup time of the data object satisfies a criterion that, when satisfied, indicates that at least two blocks of the data object should be separately fetched from the source system by different workers; determining one or more markers for end points of the at least two blocks using data from a prior backup of the data object; and causing, at least partially concurrently for two or more blocks from the at least two blocks, a respective backup worker to fetch the respective block from the source system using at least one marker from the one or more markers that defines an end of the respective block. These features can reduce a backup time compared to other systems.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, determining the one or more markers can include: determining, using the data from the prior backup, a quantity of the at least two blocks of the data object that should be separately fetched from the source system; and determining the one or more markers that each define at least one endpoint of a corresponding block using the quantity of the at least two blocks, a size of the data object and the data from the prior backup. These features can improve the parallelization process, reducing a backup time, because the markers for the blocks, and the block sizes, are determined using the data from the prior backup.

In some implementations, the method can include receiving a fetched block from the at least two blocks out of an order according to the marker for the fetched block; stitching, according to the marker for the fetched block and other markers for the other fetched blocks, the fetched block into a file for the data object; after stitching all blocks from the at least two blocks in the file for the data object, sorting the data in the file for the data object; and storing, in memory, the sorted data in the file for the data object. By stitching the blocks according to the markers, these features can reduce a time required for the sorting process.

In some implementations, the method can include comparing, using the sorted data in the file for the data object, at least a first portion of a current backup of the data object with at least a second portion of a second prior backup of the data object; and providing, as output, data for the comparison.

In some implementations, the prior backup and the second prior backup can be the same backup.

In some implementations, determining whether the size of the data object satisfies the criterion can occur during the prior backup of the data object. This can reduce the amount of time required for the backup process itself.

In some implementations, determining whether the size of the data object satisfies the criterion can occur during a current backup process of the data object that includes causing the respective backup worker to fetch the respective block from the source system. This can reduce an amount of data stored for the prior backup, e.g., in that the results of this analysis would need to be stored as part of the prior backup if performed at that time. This can reduce a likelihood of additional analysis required if there are any errors in the size determination or corresponding analysis.

In some implementations, determining the one or more markers can occur during the prior backup of the data object. This can reduce the amount of time required for the backup process itself.

In some implementations, determining the one or more markers can occur during a current backup process of the data object that includes causing the respective backup worker to fetch the respective block from the source system. This can reduce an amount of data stored for the prior backup, e.g., in that the results of this analysis would need to be stored as part of the prior backup if performed at that time. This can reduce a likelihood of additional analysis required if there are any errors in the marker determination or corresponding analysis.

In some implementations, the data object can be a table; each of the at least two blocks can be a logic block of one or more records from the table; and a marker from the one or more markers can be a record identifier for a record in the table.

In some implementations, the prior backup can be a most recent backup sequentially of the data object for the source system. This can improve an accuracy in the system of determining the markers, determining whether the size of a data object or an estimated backup time satisfies the criterion, or a combination of both.

In some implementations, a first quantity of the one or more markers can be one less than a second quantity of the two or more blocks. This can reduce a number of markers required, and data used, for the backup process, e.g., compared to using one or more markers for each block.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this specification can reduce a backup process time, e.g., by backing up blocks of a data object that satisfies a size criterion in parallel. In some implementations, the systems and methods described in this specification can reduce computational resource usage for a particular backup of another system. For instance, since the backup resources for any particular backup process can be locked in for that backup process, by reducing an amount of backup time, those resources can be freed from use for the backup process more quickly than other systems. These computational resources can be for a backup system, a system that is being backed up, or a combination of both.

In some implementations, the systems and methods described in this specification can more accurately backup data compared to other systems. For instance, systems that backup data using only offsets may create duplicate backups of some records, miss backups of other records, or a combination of both. By using end point markers, the methods and systems described in this specifically can reduce duplicate or missed records, e.g., of the records that exist when fetching data from a source system.

In some implementations, the systems and methods described in this specification can enable backup of different types of source systems that provide different functionality, e.g., at least some of which don't provide data that indicates what has changed to the object since a prior request. For instance, some software as a service platforms might provide synthetic backups that identify what has changed since a prior backup or a prior request. But since only some source systems provide synthetic backups, such a process to reduce overall backup time is not applicable or feasible for all source systems. By using end point markers, a system or method can apply a similar process across source systems to improve backup performance, e.g., with reduction or elimination of duplicate or missed records.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 depicts an example data object with markers.

Like reference numbers and designations in the various drawings indicate like elements.

DETAILED DESCRIPTION

When a backup system backs up objects, e.g., tables, from another system sequentially, the largest object can limit the minimum amount of time for a backup process of the other system. For instance, although the backup system might be able to backup five objects from the other system in three hours, if the backup process of the remaining sixth object takes ten hours, the minimum amount of time to backup the other system, irrespective of a number of backup workers that separately process different objects, is ten hours.

To reduce the minimum amount of time to backup the other system, the backup system can intelligently slice one or more data objects that have sizes that satisfy a size criterion. For instance, the backup system can determine markers in the object to use as reference points to intelligently break the object into blocks and use the reference points to assign different blocks to different backup workers.

When the object is a table, the backup system can use record identifiers to determine the blocks. For instance, the backup system can determine a number of blocks for the table that should be backed up separately. The backup system can determine the number of records for each of the blocks given the number of blocks and the total number of records in the table. The backup system can assign a range of identifiers to each of the blocks given the identifiers in the blocks. For instance, if the last record in the first piece has an identifier of 5eft8, the backup system can assign all records with identifiers less than or equal to that identifier to that first piece, and records with identifiers greater than that identifier to the second piece, e.g., up to another identifier depending on the number of blocks.

If the backup system were to use offsets, the backup system might not get complete information, might get duplicate information, e.g., backup a single record multiple times, or both. For instance, when data in the object continues to change, the offsets won't reflect those changes. As the data changes, and the backup system requests additional data given a particular offset, e.g., for the second set of "x" records, the particular records that were received in response to a prior request can change with respect to the particular offset. If a record is added, then the last record that was received in response to the prior request would then be after the particular offset, and would be backed up twice. If a record is deleted, then a record that should have been the first record for the subsequent request will fall below the offset and would not be sent to the backup system. As a result, use of identifiers can enable the backup system to more accurately backup portions of the object, e.g., reducing redundant backups, portions of the object that are not backed up, or both.

Figure 1:
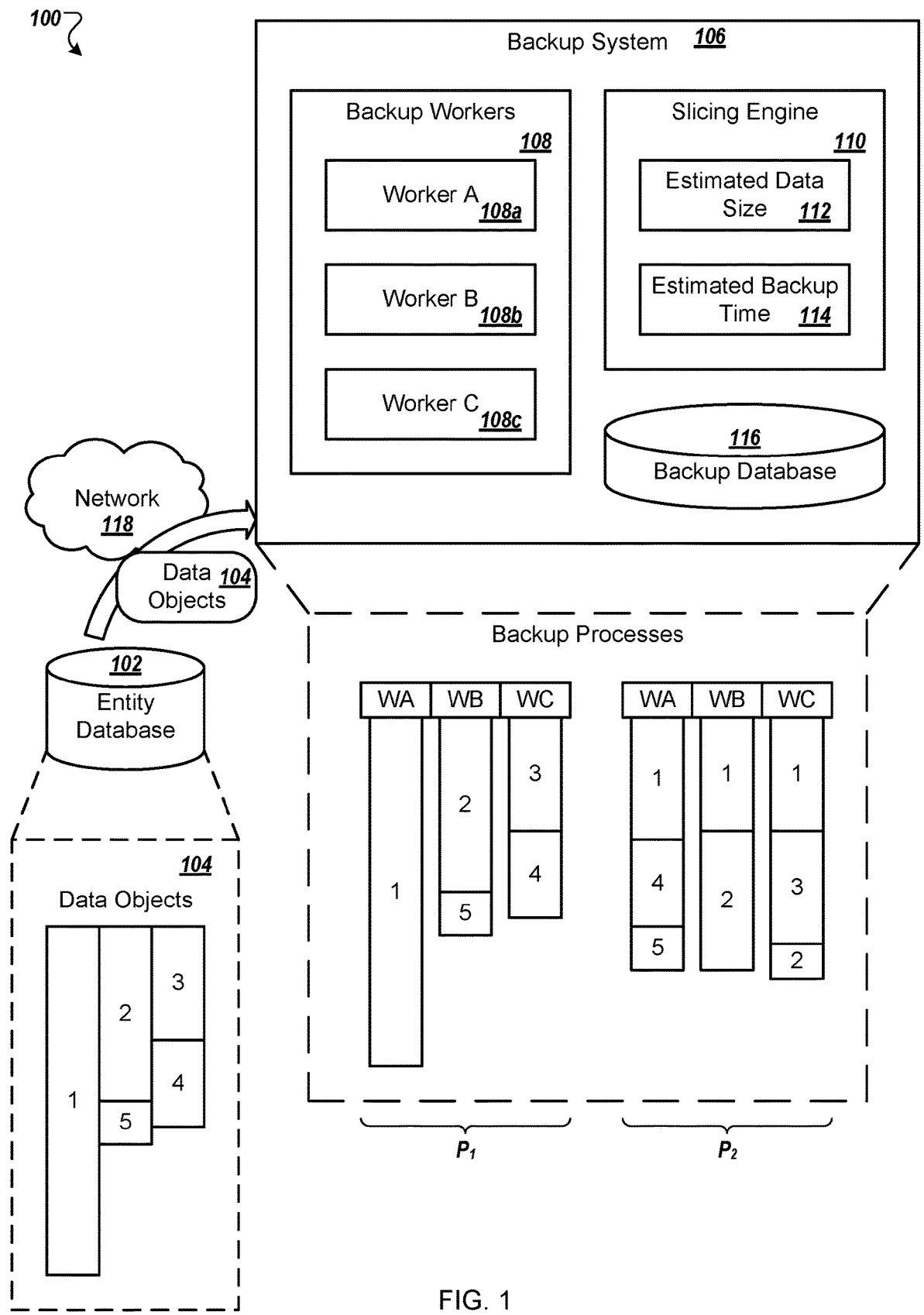
FIG. 1 depicts an example environment of a source entity database with multiple data objects and a backup system.

FIG. 1 depicts an example environment 100 of a source entity database 102 with multiple data objects 104 and a backup system 106. The backup system 106 can backup one or more of the data objects 104, labeled one through five, from the entity database. The entity database 102 is an example of a source system that is the source of data for a backup process.

The entity database 102 can be part of any appropriate type of system. For example, the entity database 102 can be part of a cloud database for an entity, e.g., a business.

When performing a backup of the entity database 102, the backup system 106 can use multiple backup workers 108 to backup separate data objects. For instance, as part of a backup process P1, the backup system can use a worker A 108a to backup a first data object, a worker B 108b to backup second and fifth data objects, and a worker C 108c to backup third and fourth data objects.

Figure 2:
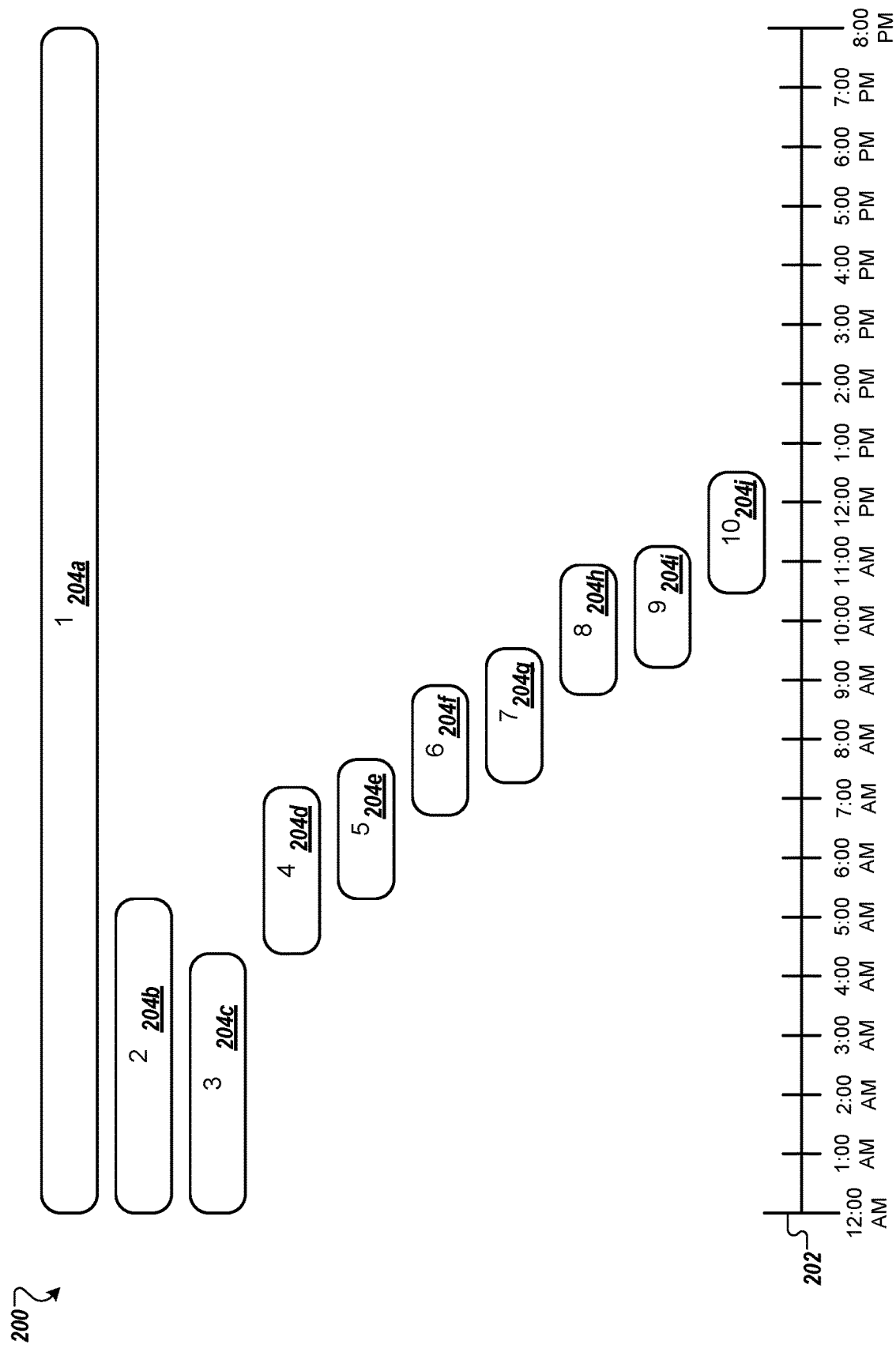
FIGS. 2-3 depict example backup processes.
Figure 3:
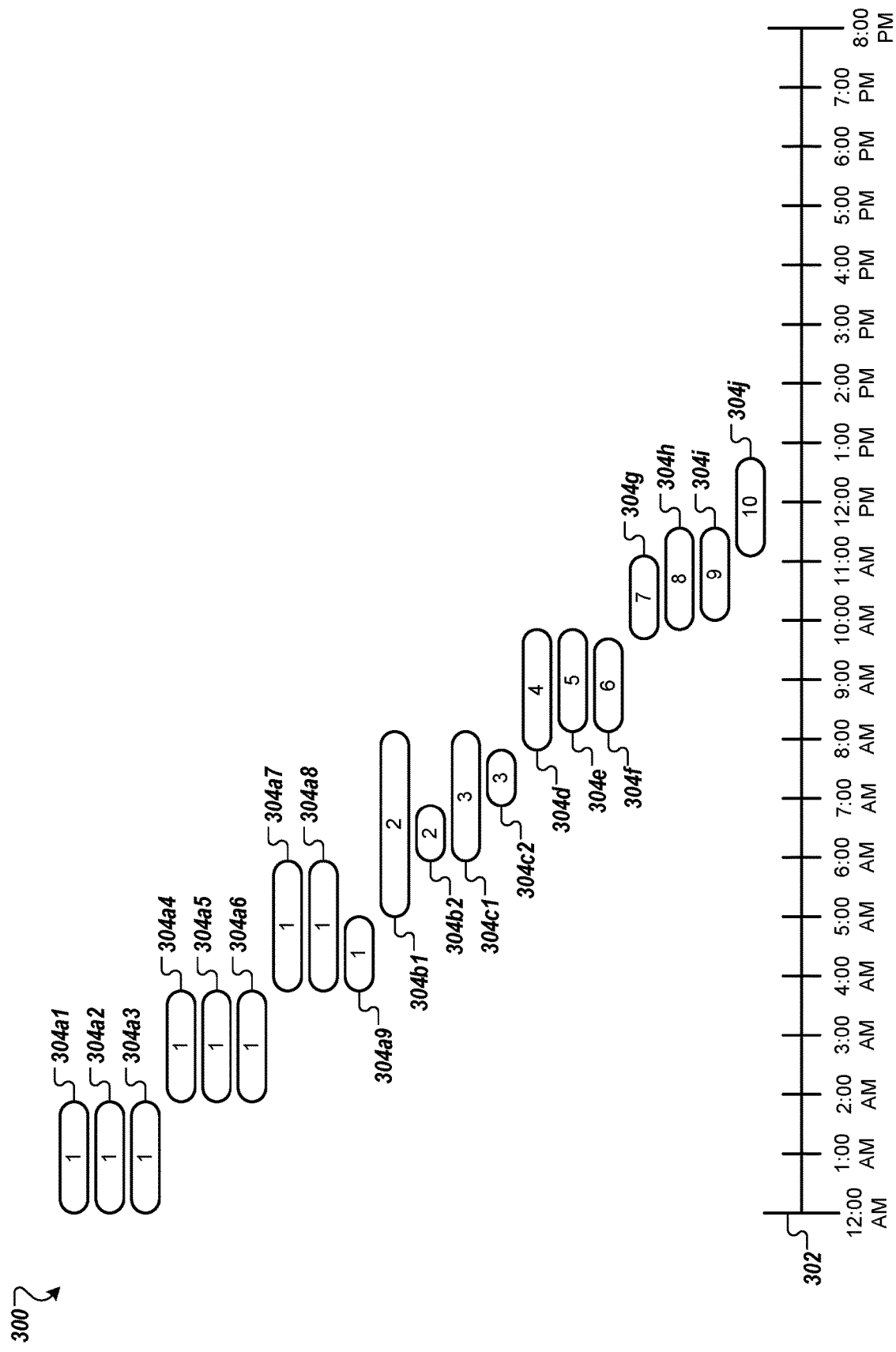

FIGS. 2-3 depict example backup processes 200-300. In FIG. 2, the backup process 200 is for ten data objects 204a-j, one through ten. In the backup process 200, there are three backup workers that begin by backing up the first, second, and third data objects 204a-c at 12 am. When the third worker finishes backing up the third data object 204c, the third worker begins backing up the fourth data object 204d. Similarly, when the second worker finishes backing up the second data object 204b, the second worker can begin backing up the fifth data object 204e. Since the first data object 204a is the largest, the first worker can continue to backup the first data object while the other workers backup the remaining data objects.

Since each data object is backed up by a single worker, the size of the largest data object limits the minimum amount of time for the backup process. For instance, the minimum time to backup the first data object 204a is the minimum time for the entire backup process 200 irrespective of the number of workers available.

In some examples, when the backup system 106 extracts, e.g., backs up, data for a large entity database 102, the backup system 106 can parallelize extraction of multiple data objects in parallel to optimize backup time. In the above example, this can include parallelizing extraction of the first, second, and third data objects 204a-c using the three workers. If one or a few of the data objects are significantly larger than the other data objects, e.g., have gigabytes or terabytes of data in each data object, the backup system 106 has a fixed length of time to extract data. The fixed length of time is the time, e.g., table time, it takes to back up the largest data object, the data object that takes the most time, e.g., given various latencies for extracting data for that data object, or a combination of both.

Returning to FIG. 1, in some implementations, when the backup system 106 assigned the three workers A-C 108a-c to fetch data for the entity database 102 as part of a backup process P1, the backup system 106 cannot reassign any of the workers A-C 108a-c to another backup process, e.g., P2. As a result, although the workers B-C 108b-c finish fetching data for their respective data objects first, e.g., before 1 pm as shown in FIG. 2, the backup system 106 cannot reassign the workers B-C 108b-c to another backup process, resulting in non-optimized computational resource usage.

To optimize the computational resource usage, the backup system 106 includes a slicing engine 110 that can determine markers for endpoints of blocks in a data object. The slicing engine 110 can analyze data for a backup process and determine whether any data objects for the backup process can be fetched in separate blocks by separate workers 108. The slicing engine 110 can determine that for a first backup process there would not be any optimization by slicing a data object into blocks and determine that for a second backup process there would be optimization by slicing a data object into blocks.

The slicing engine 110 can use any appropriate type of data, e.g., heuristics, to determine whether a data object should be fetched in blocks by different workers. For instance, the slicing engine 110 can use an estimated data size 112, an estimated backup time 114, a number of workers 108 assigned to a backup process, how much data has been retrieved so far for a data object, or a combination of two or more of these. The estimated data size 112, the amount of data retrieved so far, or both, can be a data size, e.g., as measured in bits or bytes, a number of records, e.g., rows, a number of blocks, or a combination of two or more of these.

When the slicing engine 110 relies on the estimated data size 112, the estimated backup time 114, or both, the slicing engine 110 can use data from a prior backup for the entity database 102, e.g., a most recent backup, for either or both of the estimated values. The prior backup for the entity database 102 can be a backup stored in the backup database 116 into which the current backup for the entity database 102 is being stored. For instance, the slicing engine 110 can determine the estimated data size 112 for a data object as the size of the data object in the prior backup. The size is estimated in that the data stored in the data object changes over time, changing the size of the data object. The change can be an increase or a decrease in the size. The slicing engine 110 can determine the estimated backup time 114 using the backup time for the prior backup. Since the data in the data object changes over time, and latencies for the backup process can change, e.g., changes in network or disc access latencies, the estimated backup time 114 for the prior backup can be different to the actual backup time of the data object during a current backup process.

The slicing engine 110 can determine whether to slice a data object at any appropriate time. For example, the slicing engine 110 can determine, as part of a backup process P2, whether to slice a data object when the backup system 106 creates the prior backup, as part of a current backup process, or a combination of both. In some examples, as part of a current backup process, the slicing engine 110 analyzes data for all previously retrieved data objects and determines, for each of the previously retrieved data objects, whether blocks for the respective data object should be fetched by different workers. This can occur before the workers 108 fetch any data for any of the data objects 104 included in a current backup process. In some implementations, the slicing engine 110 can determine whether to slice a data object included in a current backup process after some data for the data object has been fetched.

When the slicing engine 110 determines that at least some blocks for a data object should be fetched by different workers 108, the slicing engine 110 determines one or more markers that indicate end points for the blocks, e.g., logic blocks. The slicing engine 110 need not define both endpoints for all blocks. For example, a block in the middle of the data object can have two markers, a first marker for a start endpoint and a second marker for a stop endpoint. A worker 108 that fetches data for the respective block can send data for the two markers to the entity database 102. In response, the worker 108 can receive data for the block, as defined by the two markers, from the entity database 102. Blocks at either end of the data object can have one or two markers. For instance, when using a single marker for a block, the other marker can be inferred, e.g., as the beginning or the end of the data object depending on the location of the block in the data object.

The slicing engine 110 determines the number of markers, and the markers, using any appropriate process. For instance, upon determining that blocks for a first data object should be fetched by different workers as part of the backup process P2, the slicing engine 110 can use data for the data object to determine the markers. The slicing engine 110 can use an estimated data size 112, a number of workers 108 assigned to a backup process, how much data has been retrieved so far for a data object, a record creation date for a record in the data object, a record modification date for a record in the data object, a number of data objects for the backup process, a number of separate blocks that will be fetched for another data object for the backup process, state data, as described in more detail below, or a combination of these to determine how to slice a data object. The estimated data size 112 can be an estimated size for the first data object, for other data objects that will be fetched as part of the backup process, such as at least a subset of the second through fifth data objects 104, or a combination of both.

The slicing engine 110 can use a creation data for a data object, or a modification data for a data object, to determine which data objects to backup. Given a quantity of data objects to backup for any particular backup process, the slicing engine 110 can determine an estimated size for the backup process. The size is estimated since the slicing engine 110 does not know in advance the current sizes of the data objects but can predict the sizes given historical sizes for the same data objects, data objects of similar types, other appropriate properties or data, or a combination of these. The slicing engine 110 can then use the estimated size for the backup process to determine the block sizes for a data object, block sizes for multiple data objects, e.g., which sizes might be different or the same depending on various parameters such as those described above, or a combination of both.

For example, the backup system 106 can backup attachments and binaries across multiple days. This can occur when the total quantity, sizes, or both, of the data objects is large enough that the backup system 106 might be unable to backup all data objects in a single day. The slicing engine 110 can use respective creation dates for each of multiple different data objects to prioritize backup of information for the data objects that will be fetched over multiple days, e.g., to determine on which day to backup respective data objects. Then, for any particular day on which the backup system 106 is performing a backup process, the backup system 106 can determine the data objects expected to be backed up for that day and break the data objects into blocks to backup, rather than having a fixed block size for a day.

These data objects can be expected to be backed up since the backup system 106 might not have data that indicates all of the data objects in a source system, e.g., the entity database 102. As a result, the backup system 106 can request backup of data objects A, B, and C and after making the request determine that data object B was likely deleted and does not need to be backed up. The backup system 106 can determine that the data object B was likely deleted by receiving a message from the entity database 102 that indicates that the data object B was deleted, by determining that a time threshold expired without receiving a response from the entity database 102 with data for the data object B, or a combination of both.

In some implementations, the slicing engine 110 can select the sizes of the blocks using a creation date, a modification date, or both. For instance, when the slicing engine 110 determines that a threshold number of data objects have dates, whether creation or modification or a combination of both, that satisfy, e.g., are within, a time period threshold, the slicing engine 110 can determine block sizes that are smaller, e.g., such that the markers are closer together, than if the dates did not satisfy the time period threshold. In this way, the slicing engine 110 can attempt to account for a higher likelihood of data changing, and new data objects being created, in the entity database 102.

The backup system 106 might receive, from the entity database 102, blocks of data for a data object that have different sizes. This can occur when data was deleted from or added to the data object, e.g., if a bunch of data in a proposed block was deleted as compared to the prior backup. For example, if the slicing engine 110 plans to have each block as 5000 rows from a data object, and 2000 rows in the middle of a block were deleted between the most recent backup and today, the blocks for the data object will likely result in varying sizes, e.g., assuming that all of the blocks did not have 2000 rows deleted.

The slicing engine 110 can use any appropriate values for the markers. For instance, the slicing engine 110 can use an identifier for the corresponding records in the data object.

FIG. 4 depicts an example data object 400 with markers 402. In the data object 400, the markers 402 are identifiers for the corresponding records in the data object 400, e.g., in a database table. The identifiers can be a primary identifier for the data object that is unique for each of the records. The slicing engine 110 can determine the identifiers while keeping the data in the data object sorted by the primary identifier, e.g., so that the slicing engine 110 can determine blocks 404a-c with sizes that are approximately the same. The sizes that are approximately the same can be defined by a size criterion. The size criterion can require that differences in the sizes are minimal, e.g., close to zero accounting for the number of blocks, the total number of records, or a combination of both. The size criterion can allow for different numbers of records being included in each of the blocks, e.g., when there are three blocks and fifty records, then two of the three blocks can have one more record than the other block or a single block can have two more records than the other two blocks.

For example, the backup system 106 can determine to backup, as a data object, a table with approximately 100 million records as a largest backup object for a backup process. The backup system 106 can determine that the estimated backup time for the table is around 30 hours to extract from the entity database 102. Since 30 hours is the absolute minimum time that is needed to back up this largest object for the backup process, the total backup time will not be less than 30 hours, e.g., plus any additional time for pre-processing and post-processing for the backup process. The slicing engine 110 can slice the data in this data object to identify one hundred markers, e.g., depending on the determined number of markers to use. The slicing engine 110 can determine the markers at around 1 million each. Using the markers as range bounds, e.g., start and end points, for each block of data, the backup system 106 can assign the blocks to the backup workers 108. The backup workers 108 can then make up to ten requests in parallel to the entity database 102 to extract data, e.g., with each backup worker 108 making a corresponding request from the ten requests. This can bring down the time taken to extract the data object from 30 hours to 3 hours, e.g., when the backup system assigns each block to a separate worker in a group of at least ten workers.

The data object 400 shown in FIG. 4 can be a data object for a prior backup of the data object 400. As part of a current backup for the data object, the backup system 106 can determine the blocks 404*a-c* using the data from the prior backup. Since the number of records included in the data object 400 changes over time, although the backup system 106 can select the markers 402 for the data object such that the blocks 404*a-c* satisfy the size criterion, at least some of the sizes of the blocks 404*a-c* for the current backup might not satisfy the size criterion. This can occur because the backup system 106 might not know the records with markers in particular ranges in advance of the current backup process.

With reference to FIG. 3, the backup system 106 can have ten data objects 304*a-j* to backup, one through ten, for a backup process 300. With three backup workers 108, the backup system 106 can slice the first data object into nine blocks 304*a*1-9. Here, the first eight blocks 304*a*1-8 can have approximately the same size, while the ninth block 304*a*9 can have a smaller size, given the determination of the markers by the slicing engine 110. This can occur because the slicing engine 110 selected an estimated smaller block size for the ninth block 304*a*9, because the actual size of the ninth block 304*a*9 is smaller than an expected size, or a combination of both.

When the third worker finishes fetching the ninth block 304*a*9, the third worker can begin fetching the second data object 304*b*. In this example, the backup system 106 initially determines to skip slicing the second data object 304*b* into multiple blocks. As the third worker retrieves the data for the second data object 304*b*, the slicing engine 110 determines to slice a remaining portion of the second data object 304*b* into blocks so that two workers can fetch data from the entity database 102 for the second data object 304*b* in parallel.

The backup workers 108 can fetch data from the entity database 102 for data objects that are not initially sliced using the same mechanism by which the backup workers 108 fetch data for sliced data objects. Sometimes, the entity database 102 has restrictions on how data in the entity database is accessed. For instance, the entity database 102 might have restrictions, e.g., transaction timers, on how long a request for access to data can remain pending. This can cause the backup workers 108 to fetch pieces of the data objects 104 as part of a backup process when the backup system 106 would be unable to retrieve an entire data object with a single request given the size of the data object, the latency of a network 118 connecting the backup system 106 to the entity database 102, other data retrieval factors, or a combination of these. For example, when the backup system 106 requests a data object 104 that includes a million records, the entity database 102 might take a few hours to provide the data object 104 to the backup system 106 absent any retrieval restrictions, e.g., transaction timers. Because of the transaction timers, the backup workers 108 would only receive some records responsive to the request and would need to submit additional requests to complete the backup of the data object.

The backup workers 108 can fetch data for the remaining data objects 304. For instance, the backup workers 108 can fetch data for the third data object 304*c*1-2. This can occur in at least two blocks as shown in FIG. 3. In this example, the slicing engine 110 determined to slice the third data object 304*c* into two blocks 304*c*1-2 before the backup workers 108 began retrieving data for the third data object.

Since the backup system 106 slices data objects into blocks, the backup system 106 is able to complete the backup process 300 before 1 pm. As shown in FIGS. 2-3, the use of data object markers and slicing can reduce the overall processing time necessary for a backup, freeing up resources for use during other processes.

In general, when the backup workers 108 fetch data for a data object, the backup workers 108 can send a request to the entity database 102 for data for the data object. The request can include an identifier for the data object, e.g., and only the identifier when the backup workers 108 might be able to retrieve the entire data object in a single request. When the backup workers 108 will need to send multiple requests for a single data object, whether the data object is sliced into multiple blocks or not, the backup workers 108 can include one or more markers in the request. For instance, as part of the fetch process, a backup worker 108 can include an identifier for the data object, e.g., that is unique to the data object, and a marker that indicates the records responsive to the request. The request can indicate that records with identifiers less than the marker value are responsive, e.g., when the backup worker 108 retrieves the initial records for a data object. The request can indicate that records with identifiers greater than the marker value are responsive, e.g., when the backup worker 108 retrieves the final records for a data object. When the request includes two markers, the request is for the records with identifiers that are between the two markers.

In some implementations, a request as part of a block fetch can indicate that the entity database 102 should send corresponding records that satisfy the markers included in the request. A record can satisfy a marker when the record has an identifier that is less than, equal to, or less than or equal to, the corresponding marker, e.g., as necessary given the marker. A record can satisfy a marker when the record has an identifier that is greater than, equal to, or greater than or equal to, the corresponding marker.

When the backup system 106 assigns a block or a data object to a backup worker 108, the backup system 106 can send instructions to the corresponding backup worker 108 that causes the backup worker to fetch the respective block or data object from the entity database 102. In this way the backup system 106, e.g., a worker assignment engine, can assign fetch processes to the various workers as part of the backup process.

In some implementations, the backup system 106 can dynamically determine to switch between sequential and parallel data extraction, e.g., which switch can occur in either direction. For example, the backup system 106, e.g., the worker assignment engine, can determine to switch from sequential data extraction to parallel data extraction for the second data object 304*b* using, for instance, an amount of capacity allocated to extract data, e.g., the number of workers 108 and other computational resources allocated to the data fetch process. The backup system 106 can use any appropriate type of data used to select block sizes when making this determination whether to switch from sequential data extraction, for a single worker, to parallel data extraction among multiple workers. This amount of capacity can include a configuration of execution parallelism on the backup system 106, a current utilization of the source entity database 102, or a combination of both. In some examples, e.g., when multiple data objects are larger than predicted, the backup system 106 can dynamically switch from parallel to sequential data extraction.

The backup system 106, the entity database 102, or both, are examples of a system implemented as computer programs on one or more computers in one or more locations, in which the systems, components, and techniques described in this specification are implemented. The network 118, such as a local area network ("LAN"), wide area network ("WAN"), the Internet, or a combination thereof, connects the entity database 102, and the backup system 106. The backup system 106, the entity database 102, or both, can use a single computer or multiple computers operating in conjunction with one another, including, for example, a set of remote computers deployed as a cloud computing service.

The backup system 106 can include several different functional components, including the backup workers 108, the slicing engine 110, and the worker assignment engine. The backup workers 108, the slicing engine 110, the worker assignment engine, or a combination of these, can include one or more data processing apparatuses, can be implemented in code, or a combination of both. For instance, each of the backup workers 108, the slicing engine 110, and the worker assignment engine can include one or more data processors and instructions that cause the one or more data processors to perform the operations discussed herein.

The various functional components of the backup system 106 can be installed on one or more computers as separate functional components or as different modules of a same functional component. For example, the backup workers 108, the slicing engine 110, and the worker assignment engine of the backup system 106 can be implemented as computer programs installed on one or more computers in one or more locations that are coupled to each through a network. In cloud-based systems for example, these components can be implemented by individual computing nodes of a distributed computing system.

Figure 5:
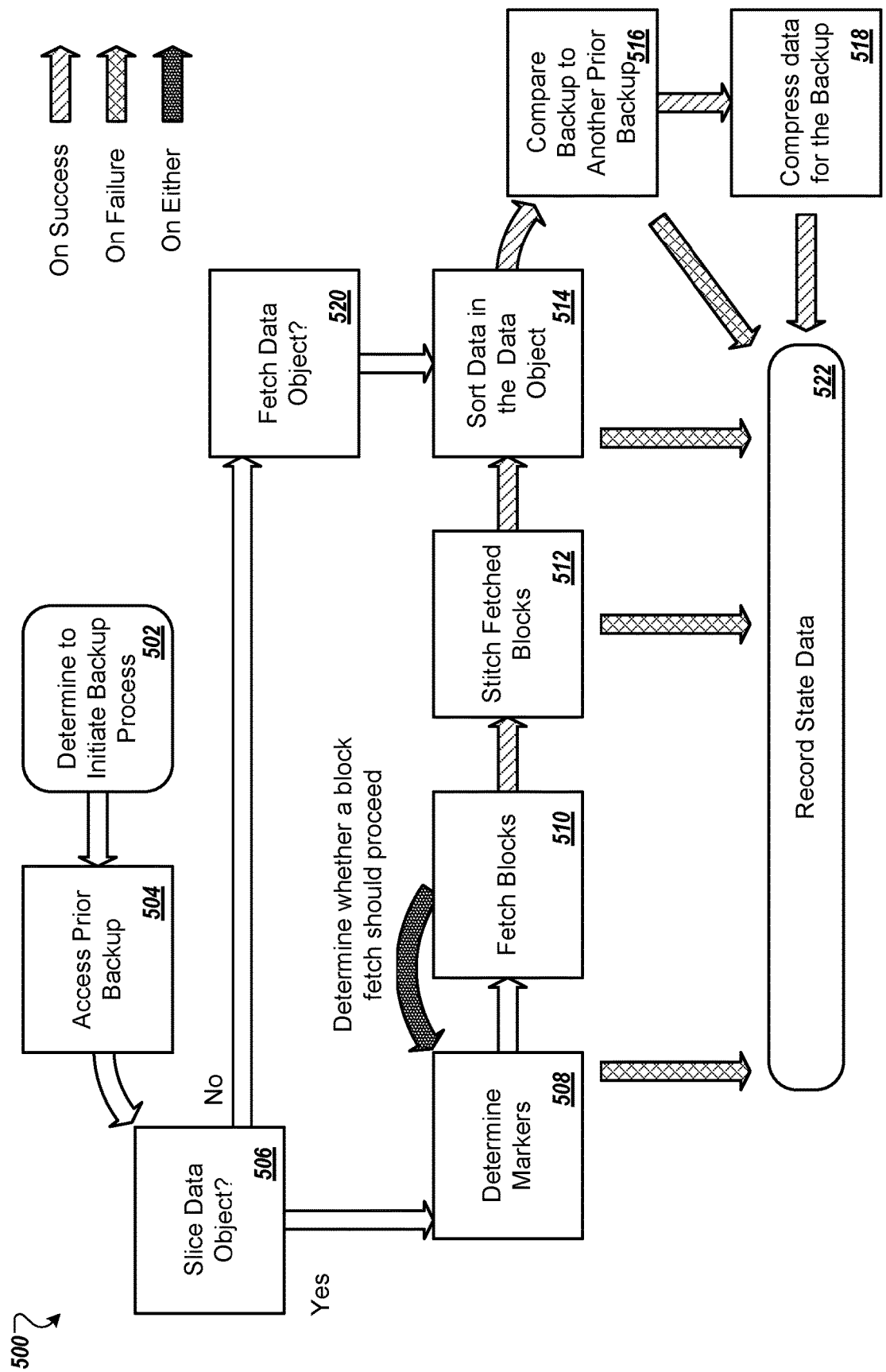
FIG. 5 is a flow diagram of an example process for backing up a data object using markers.

FIG. 5 is a flow diagram of an example process 500 for backing up a data object using markers. For example, the process 500 can be used by the backup system 106 from the environment 100.

The backup system determines to initiate a backup process (502). For instance, the backup system can initiate the backup process of a data object according to a schedule or in response to a request for a backup process. The backup process can be for a single data object or multiple data objects, e.g., for a database.

The backup system accesses a prior backup (504). The backup system can access the most recent prior backup sequentially. When the backup system backs up data objects for an entity at different frequencies, the backup system can access the prior backup of the data object for which the process 500, or one or more operations in the process 500, are being performed.

The backup system determines whether to slice a data object (506). For instance, the backup system can determine, for a data object of a backup process for a source system, whether a size of the data object or an estimated backup time of the data object satisfies a criterion that, when satisfied, indicates that at least two blocks of the data object should be separately fetched from the source system by different workers. If the backup system determines that the criterion is not satisfied, the process 500 can proceed to operation 520, described in more detail below.

The backup system determines markers (508). For example, when the backup system determines that the criterion is satisfied, the backup system can determine the markers. The backup system can determine one or more markers for end points of the at least two blocks using data from a prior backup of the data object. The markers can define predicted sizes of the corresponding blocks. Some of the blocks can have sizes with size differences from another size for another block that either does or does not satisfy a size criterion. The size criterion can be that all block sizes are substantially the same, e.g., within a threshold size of each other. The sizes of the blocks can be determined using the markers for the blocks and the prior backup data. Although the markers can be identifiers for corresponding records, since the data object need not, and likely does not, include a record for each sequential identifier, the backup system can use both the markers and the records for the prior backup to determine a predicted size for a block.

The backup system fetches blocks (510). For instance, the backup system can assign a block to a worker. In some implementations, there are at least two workers for the backup process so that the different workers can be assigned different blocks for the data object. Assigning a block to a worker can include causing, at least partially concurrently for two or more blocks from the at least two blocks, a respective backup worker to fetch the respective block from the source system using at least one marker from the one or more markers that defines an end of the respective block.

As part of the fetching process, the backup system can determine whether a block fetch should proceed. This can include determining whether at least one other block fetch failed, whether the backup system received an abort backup command, or a combination of both. In some implementations, when the backup system determines that at least one other block fetch failed, the backup system can determine to skip fetching another block. In these implementations, the backup system can stop performing the process 500 for the respective data object, source system, or both. When the backup system determines that it received an abort backup command, the backup system can stop performing the process 500 for the respective data object, source system, or both. By determining whether a block fetch should proceed, the backup system can include one or more guards to stop a backup process, freeing up resources when a backup would be unsuccessful or should not otherwise be completed, compared to other systems.

The backup system stitches fetched blocks (512). For instance, the blocks can have an order defined by the markers, e.g., the identifiers used for the markers. The backup system can receive at least some of the blocks out of order, e.g., can receive a fetched block from the at least two blocks out of an order according to the marker for the fetched block. This can occur when the backup system assigns blocks out of order to the workers, when the source system provides the blocks to the backup system out of order, or a combination of both. In implementations in which the backup system sorts data in the data object, the backup system can stitch the fetched blocks in order to reduce a processing time for the sort operation. The stitching can include stitching, according to the marker for the fetched block and other markers for the other fetched blocks, the fetched block into a file for the data object.

The backup system sorts data in the data object (514). For example, the backup system can sort the data in the data object. This can include after stitching all blocks from the at least two blocks in the file for the data object, sorting the data in the file for the data object. In some examples, the backup system can store, in memory, the sorted data in the file for the data object.

The backup system compares the backup to another prior backup (516). The backup system can compare the backups, e.g., two sequential backups, for data analytics purposes. The other prior backup can include the prior backup used to determine whether to slice the data object, the markers, or both. The comparison can include comparing, using the sorted data in the file for the data object, at least a first portion of a current backup of the data object with at least a second portion of a second prior backup of the data object. The backup system can provide, as output, data for the comparison, e.g., to a device for presentation.

The backup system compresses data for the backup (518). The backup system can compress data for optimized storage, effective transfer of information over a network, or a combination of both. By compressing data for the backup after the compare operation 516 completes can avoid the fixed cost of compressing all the files at the end of the backup process 500. For example, the backup system can determine the data objects or portions of data objects that changed from the prior backup to the current backup, e.g., a delta. The backup system can compress only these changed data, e.g., the delta.

The backup system fetches the data object (520), e.g., with a single worker. For instance, when the backup system determines to skip slicing the data object, the backup system can perform one or more checks to determine whether to proceed with the backup process, e.g., similar to those described above with respect to operation 510. The backup system can initiate fetching of the data object. While the backup system is fetching the data object, the backup system can determine whether to dynamically slice the data object, e.g., using data for the fetch operation. For instance, the backup system can determine to perform operation 506 for the remaining portion of the data object that has not yet been received although fetching of that remaining portion was assigned to a single worker.

The backup system records state data (522). The section state can include any appropriate data about the backup process. For instance, the backup system, throughout the backup process, can store data for the section state. This storage can be part of the recordation of the section state, temporary storage for a recordation at the end of the process 500, or some other appropriate process or operations. The backup system can use this state data during subsequent backups, for analysis of the backup process, or in any other appropriate process.

The state data can include information about whether the backup process for a data object was able to finish successfully, warning data, error data, or a combination of these. The state data can include this type of data for each data object, for the backup process as a whole, or a combination of both.

The state data can include any combination of the size of the data extracted; number of items extracted, added, modified or deleted since the last backup of the data object; the time it took to extract the data object; the markers that were used in the backup process for the data object; new marker information that can be used for future backup process for this data object; or a combination of two or more of these.

The state data can include data for any analysis performed during the process 500. This analysis data can include data for analysis done when stitch blocks, e.g., during operation 512; when sorting data of the data object, e.g., during operation 514; when comparing the backup to the other prior backup, e.g., during operation 516; or when compressing data for the backup, e.g., during operation 518; or a combination of two or more of these.

The order of operations in the process 500 described above is illustrative only, and backing up a data object using markers can be performed in different orders. For example, the backup system can determine whether to slice a data object, determine the markers, or both, before determining to initiate the backup process. This can occur, for instance, as part of the backup process of the prior backup.

In some implementations, the process 500 can include additional operations, fewer operations, or some of the operations can be divided into multiple operations. For example, the process 500 might not include one or more of operations 502, 504, 512, 514, 516, 518, 520, or 522. For instance, the process 500 might include only operations for 506, 508, and 510.

In this specification, the term "database" is used broadly to refer to any collection of data: the data does not need to be structured in any particular way, or structured at all, and it can be stored on storage devices in one or more locations. A database can be implemented on any appropriate type of memory.

In this specification the term "engine" refers broadly to refer to a software-based system, subsystem, or process that is programmed to perform one or more specific functions. Generally, an engine will be implemented as one or more software modules or components, installed on one or more computers in one or more locations. In some instances, one or more computers will be dedicated to a particular engine. In some instances, multiple engines can be installed and running on the same computer or computers.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse or a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some instances be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures, such as spreadsheets, relational databases, or structured files, may be used.

Particular implementations of the invention have been described. Other implementations are within the scope of the following claims. For example, the operations recited in the claims, described in the specification, or depicted in the figures can be performed in a different order and still achieve desirable results. In some implementations, multitasking and parallel processing may be advantageous.

What is claimed is:

1. A computer-implemented method comprising:
   determining, for a data object of a backup process for a source system, whether a size of the data object or an estimated backup time of the data object satisfies a criterion that, when satisfied, indicates that at least two blocks of the data object should be separately fetched from the source system by different workers;
   determining one or more markers for end points of the at least two blocks using data from a prior backup of the data object; and
   causing, at least partially concurrently for two or more blocks from the at least two blocks, a respective backup worker to fetch the respective block from the source system using at least one marker from the one or more markers that defines an end of the respective block.

2. The method of claim 1, wherein determining the one or more markers comprises:
   determining, using the data from the prior backup, a quantity of the at least two blocks of the data object that should be separately fetched from the source system; and
   determining the one or more markers that each define at least one endpoint of a corresponding block using the quantity of the at least two blocks, a size of the data object and the data from the prior backup.

3. The method of claim 1, comprising:
   receiving a fetched block from the at least two blocks out of an order according to the marker for the fetched block;
   stitching, according to the marker for the fetched block and other markers for the other fetched blocks, the fetched block into a file for the data object;
   after stitching all blocks from the at least two blocks in the file for the data object, sorting the data in the file for the data object; and
   storing, in memory, the sorted data in the file for the data object.

4. The method of claim 3, comprising:
   comparing, using the sorted data in the file for the data object, at least a first portion of a current backup of the data object with at least a second portion of a second prior backup of the data object; and
   providing, as output, data for the comparison.

5. The method of claim 4, wherein the prior backup and the second prior backup comprise the same backup.

6. The method of claim 1, wherein determining whether the size of the data object satisfies the criterion occurs during the prior backup of the data object.

7. The method of claim 1, wherein determining whether the size of the data object satisfies the criterion occurs during a current backup process of the data object that includes causing the respective backup worker to fetch the respective block from the source system.

8. The method of claim 1, wherein determining the one or more markers occurs during the prior backup of the data object.

9. The method of claim 1, wherein determining the one or more markers occurs during a current backup process of the data object that includes causing the respective backup worker to fetch the respective block from the source system.

10. The method of claim 1, wherein:
    the data object comprises a table;
    each of the at least two blocks comprises a logic block of one or more records from the table; and
    a marker from the one or more markers comprises a record identifier for a record in the table.

11. The method of claim 1, wherein the prior backup comprises a most recent backup sequentially of the data object for the source system.

12. The method of claim 1, wherein a first quantity of the one or more markers is one less than a second quantity of the two or more blocks.

13. A system comprising one or more computers and one or more storage devices on which are stored instructions that are operable, when executed by the one or more computers, to cause the one or more computers to perform operations comprising:
    determining, for a data object of a backup process for a source system, whether a size of the data object or an estimated backup time of the data object satisfies a criterion that, when satisfied, indicates that at least two blocks of the data object should be separately fetched from the source system by different workers;
    determining one or more markers for end points of the at least two blocks using data from a prior backup of the data object; and
    causing, at least partially concurrently for two or more blocks from the at least two blocks, a respective backup worker to fetch the respective block from the source system using at least one marker from the one or more markers that defines an end of the respective block.

14. The system of claim 13, wherein determining the one or more markers comprises:
    determining, using the data from the prior backup, a quantity of the at least two blocks of the data object that should be separately fetched from the source system; and
    determining the one or more markers that each define at least one endpoint of a corresponding block using the quantity of the at least two blocks, a size of the data object and the data from the prior backup.

15. The system of claim 13, the operations comprising:
    receiving a fetched block from the at least two blocks out of an order according to the marker for the fetched block;
    stitching, according to the marker for the fetched block and other markers for the other fetched blocks, the fetched block into a file for the data object;
    after stitching all blocks from the at least two blocks in the file for the data object, sorting the data in the file for the data object; and
    storing, in memory, the sorted data in the file for the data object.

16. The system of claim 15, the operations comprising:
    comparing, using the sorted data in the file for the data object, at least a first portion of a current backup of the data object with at least a second portion of a second prior backup of the data object; and
    providing, as output, data for the comparison.

17. The system of claim 16, wherein the prior backup and the second prior backup comprise the same backup.

18. The system of claim 13, wherein determining whether the size of the data object satisfies the criterion occurs during the prior backup of the data object.

19. The system of claim 13, wherein determining whether the size of the data object satisfies the criterion occurs during a current backup process of the data object that includes causing the respective backup worker to fetch the respective block from the source system.

20. One or more computer storage media encoded with instructions that, when executed by one or more computers, cause the one or more computers to perform operations comprising:
- determining, for a data object of a backup process for a source system, whether a size of the data object or an estimated backup time of the data object satisfies a criterion that, when satisfied, indicates that at least two blocks of the data object should be separately fetched from the source system by different workers;
- determining one or more markers for end points of the at least two blocks using data from a prior backup of the data object; and
- causing, at least partially concurrently for two or more blocks from the at least two blocks, a respective backup worker to fetch the respective block from the source system using at least one marker from the one or more markers that defines an end of the respective block.

\* \* \* \* \*